United States Patent [19]
Jacobson

[11] Patent Number: 5,587,997
[45] Date of Patent: Dec. 24, 1996

[54] METHOD AND APPARATUS FOR DETERMINING WHEN ALL PACKETS OF A MESSAGE HAVE ARRIVED

[75] Inventor: David M. Jacobson, Santa Clara, Calif.

[73] Assignee: Hewlett-Packard Company, Palo Alto, Calif.

[21] Appl. No.: 393,650

[22] Filed: Feb. 24, 1995

[51] Int. Cl.$^6$ ....................................................... H04J 3/22
[52] U.S. Cl. ........................................................ 370/253
[58] Field of Search .............................. 370/17, 58.2, 60, 370/94.1, 119, 94.2, 94.3, 60.1, 105.1, 58.3, 13, 14; 395/200, 325

[56] References Cited

U.S. PATENT DOCUMENTS

| | | | |
|---|---|---|---|
| 4,769,810 | 9/1988 | Eckberg, Jr. et al. | 370/60 |
| 5,187,707 | 2/1993 | Chu et al. | 370/94.1 X |
| 5,285,442 | 2/1994 | Iwamura | 370/17 |
| 5,323,392 | 6/1994 | Ishii | 370/94.1 X |
| 5,361,393 | 11/1994 | Wells et al. | 395/800 |
| 5,461,614 | 10/1995 | Lindholm | 370/60 |

OTHER PUBLICATIONS

Clark, David M., "IP Datagram Reassembly Algorithms", RFC:815, MIT Laboratory for Computer Science, Computer Systems and Communications Group, Jul. 1982.

Lobelle, Marc C., "Datagrams Transferred as Message Trains in Local Area Networks, Interfaces in Computing", 1984, 2:131–136.

*Primary Examiner*—Benedict V. Safourek
*Assistant Examiner*—Ricky Ngo

[57] ABSTRACT

A method and apparatus for determining when all packets of a message sent over a computer network by a source computer have arrived at a destination computer includes a counter located at the source computer for storing an initial value and for assigning a delta value to each packet in the message, where the last packet stores a delta value that is equal to the counters initial value minus number of packets previously sent modulo the counter range; and includes an accumulator located at the destination computer for extracting the delta value from each packet of the message. The destination computer is notified that all packets in the message have arrived only when the sum of the extracted delta values stored in the accumulator is equal to zero modulo the capacity of the accumulator.

26 Claims, 4 Drawing Sheets

METHOD AND APPARATUS FOR DETERMINING WHEN ALL PACKETS OF A MESSAGE HAVE ARRIVED

BACKGROUND OF THE INVENTION

1. Technical Field

The present invention relates to the exchange of messages between a plurality of interconnected computers. More particularly, the present invention relates to a method and apparatus for determining when all of the packets of a message sent by a source computer have arrived at a destination computer.

2. Description of the Prior Art

A computer network includes collections of interconnected computers, also known as multicomputers or clusters. FIG. 1 is a block diagram of a typical computer network. In the figure, several computers 19, 20 are shown connected to a network, also referred to as an interconnection fabric, which includes several network nodes 10–12, 16–18. Each node may in turn be connected to a hub 13, 15, and also to one or more routers 14, 21. In such networks, data are transferred from one computer to another in the form of messages, where each message consists of one or more fixed size or limited variable-size packets. The packets are each transmitted from a source computer to a destination computer via the interconnect fabric. Such networks vary widely in the delivery guarantees they provide. Some networks (e.g. Ethernet) drop or duplicate packets, while some guarantee each packet will be delivered exactly once. Because better performance is achievable when packets are routed around congestion or take varied or random routes to the destination, many high performance interconnects do not route all packets that comprise a message by the same route. This gives rise to the possibility that packets taking one route arrive at the destination earlier than packets that may have been transmitted earlier but took a different (and slower or more congested) route. Thus, the packets may arrive at the destination computer out of sequence.

The present invention is in the context of interconnects that deliver each packet exactly once, but make no guarantees regarding delivery order.

The receiving computer normally consists of several components, each with an expense (in time) associated with its knowing or responding to something. An interface card can know or respond to something in almost zero time. The operating system can be informed of some event and run briefly, by means of a procedure known as an interrupt. This may cost a few hundred cycles, or the operating system may have to suspend the operation of whatever program was currently run and start up the application involved with the incoming message. The action of suspending one process and starting up another is called a context switch. Context switching can take thousands of cycles.

To avoid delays between when the data arrives and when it can be used, the data from each packet are deposited directly into their final destination addresses, rather then first depositing them into temporary buffers, from which they may be copied to a final destination. In addition the destination computer must be notified when all the packets comprising a message have arrived.

The problem is to determine when this has occurred.

This problem can be subdivided in several cases. The first is the case where this is only one sender, hereinafter referred to as the single-sender problem. Several solutions to the single-sender problem have been proposed, including:

1. Place a flag in the last packet of a message indicating that it is the last packet. This solution only works with systems that guarantee in-order delivery of packets. As discussed above, many interconnect fabrics do not guarantee in-order delivery.
1. Require the receiving computer to know in advance how many packets are sent.
    Place this value in a counter and decrement the counter as each packet arrives until the value in the counter equals zero. This solution does not allow the transmission of data whose size is not known in advance by the receiving computer.
1. Place a value equal to the total of the number of packets sent for a particular message in the first packet, then count down at the receiving computer as each packet is received until the count is equal to zero. Unfortunately, there are two problems with this solution:
    a. The computer network must guarantee that the first packet actually arrives at the destination first, either by limiting the interconnect fabric to one that guarantees in-order delivery; or by having the receiving computer acknowledge receipt of the first packet, in which case the sending computer must wait for this acknowledgement before sending subsequent packets. This latter approach is undesirable because it introduces additional delay and complexity into the computer network; and
    b. The computer network must determine the total number of packets that are sent before the first packet is launched.

A second problem, hereinafter referred to as the multiple sender problem, occurs in a computer network in the situation in which one computer receives messages from multiple source computers, and must determine when all of the packets comprising all these messages have arrived. The number of source computers may be known in advance by the destination computer, but each message may consist of a different number of packets. Several solutions to the multiple sender problem have been proposed, including:

1. Providing a counter at the destination computer that is initialized to the number of sources (i.e. source computers) from which messages are received. The choice of interconnect fabrics is then limited to those that guarantee in-order delivery. Each source computer sets a last-packet flag in the last packet of each message. Every time the destination computer receives a packet in which the last-packet flag is set, it decrements the counter. When the counter reaches zero, the destination computer is notified that all packets of all messages have arrived.
2. Requiring the destination computer to know in advance how many packets are sent.
    Place this value in a counter and decrement the counter when each packet arrives at the destination computer until the value in the counter equals zero. Unfortunately, this approach does not allow the transmission of data whose size is not known in advance.
3. Providing a vector containing a counter for each source computer. Each source computer then sends the first packet of its message, which includes a number that indicates the total number of packets in the message. It must be assured, for example by one of the methods described above for the single-sender case, that the first packet arrives before any of the other packets from the same source computer. As each packet arrives, its counter is decremented. When all the counters are zero, the destination computer is notified. In addition to those limitations described above, an additional disadvantage of this approach is that the maximum possible number of source computers is limited by the size of the vector of counters.

4. The destination computer receives the message from each source computer separately, using known methods. The destination computer counts the incoming messages and when the requisite number have arrived it commences processing.

Because the destination computer must context switch to accept each message, this solution requires an excessive number of context switches at the destination computer.

A third problem, referred to hereinafter as the dynamic sender problem, occurs in a computer network when the number of source computers is not known by any one node. Rather, each receiving node knows of some set of sending nodes, but these nodes may have delegated responsibility for part of the application to yet other nodes.

These other nodes also have to send messages to the destination computer, and this can proceed recursively.

The obvious solution to the dynamic sender problem is to have each node that has delegated responsibility to other nodes collect the data from those nodes and forward this data to the destination computer. This can be done by any of the multiple sender techniques listed above. Alternatively, each node that delegates responsibility to other nodes can forward a list of those nodes to the node from which it received its responsibility. Eventually, the top level nodes forward the information to the destination computer, which can then use any of the techniques described above in connection with the multiple sender problem.

One proposed solution to the problem of assembling received packets into a message is described in connection with the Internet by D. Clark, *Datagram Reassembly Algorithms*, MIT Laboratory for Computer Science, Computer Systems and Communications Group, RFC: 8151P, July 1982. The Internet consists of a collection of many computer networks, each of which has its own characteristics.

When an Internet Protocol (IP) packet is generated, it may have some size corresponding to the capability of the computer network in which it was generated. As the IP packet is routed to its destination, it may have to pass through another computer network that is not able handle packets that large, so it is fragmented into smaller packets. There is no requirement in the Internet Protocol that such fragments do not overlap.

Clark discloses a technique that determines when all the packets comprising a full Internet packet have arrived. First, it is necessary to keep track of all the fragments.

Second, when a new fragment arrives, it may be combined with the existing fragments in a number of different ways. For example, it may precisely fill the space between two fragments, it may overlap with existing fragments, it may completely duplicate existing fragments, or it may partially fill a space between two fragments without abutting either of them. Thus, reassembly involves a complicated algorithm that tests for a number of different options.

A partially reassembled message consists of certain sequences of fragments that have already arrived, and certain areas that are to contain fragments still to come. These missing areas are referred to as holes. Each hole can be characterized by two numbers: the number of the first fragment in the hole, and the number of the last fragment in the hole. This pair of numbers is referred to as the hole descriptor. All of the hole descriptors for a particular message are gathered together in a hole descriptor list.

The general form of Clark's algorithm is as follows: When a new fragment of the message arrives, it can possibly fill in one or more of the existing holes. Each of the entries in the hole descriptor list is examined to see whether the hole in question is eliminated by this incoming fragment. If so, that entry is deleted from the hole descriptor list. Eventually, all of the fragments necessary to complete the message have arrived, such that every entry is eliminated from the hole descriptor list. At this point, the message has been completely reassembled and can be passed to higher protocol levels for further processing.

See, also M. C. Lobelie, *Datagrams Transferred As Message Trains In Local Area Networks*, Interfaces in Computing, 2 (1984) pps. 131–146, which discloses a method for guaranteeing the integrity of a packet transfer sequence, where both the sender and the receiver know the structure of the message before the message is sent. The received packets are counted and an acknowledgment packet is sent to the sender by the receiver for an entire message.

It would be advantageous to provide a method and apparatus that determines when all of the packets in a message have been received, but that is not subject to the limitations of the known techniques discussed above.

SUMMARY OF THE INVENTION

The invention provides an apparatus for determining when all packets of a message have arrived at a destination computer when the interconnect fabric in a computer network does not guarantee in-order delivery. The invention consists of a counter located at each source computer, an accumulator at the destination computer, a delta field in each packet, a mechanism at the destination computer that determines when the accumulator has stored a predetermined value, e.g. zero, and a protocol that is used between the various communicating processes. All the counters and the accumulator have the same number of bits or digits, such that they count or accumulate modulo the same modulus. Thus, for example, a counter containing the maximum representable value would return to zero upon the next count. At the source computer, the counter stores an initial value and is adapted to assign a delta value to each packet in a message. At the destination computer, the accumulator extracts the delta value from each packet of the message, such that the destination computer is notified that all packets in the message have arrived only when the sum of the extracted delta values stored in the accumulator is equal to the initial value stored in the counter. One advantage of this approach is that it operates effectively in computer networks that do not provide in-order delivery without the need to communicate packet counts or sender identities in a separate message round.

DETAILED DESCRIPTION OF THE INVENTION

The invention addresses problems that arise when the interconnect fabric in a computer network guarantees delivery of each packet (without splitting into multiple smaller packets) and never duplicates packets, but does not guarantee in-order delivery of packets. The invention consists of a counter at each source computer, an accumulator at the destination computer, including a mechanism at the destination computer that determines when the accumulator is a predetermined value, e.g. zero, and a protocol that is used between the various communicating processes in the computer network.

In the preferred embodiment of the invention, the hardware at the source computer and destination computer is very simple, as is the protocol. For example, in a multiple sender application the method and apparatus described herein eliminates the need for the receiving computer to context switch to the receiving application upon the arrival of each message. Instead, the destination computer context switches to the receiving application only once, when all the messages have arrived, saving the overhead of n-1 context switches if there are n source computers. In a dynamic sender application, the method and apparatus described herein eliminates the need to provide extra messages to the destination computer that contain information about the set of source computers.

Figure 1:
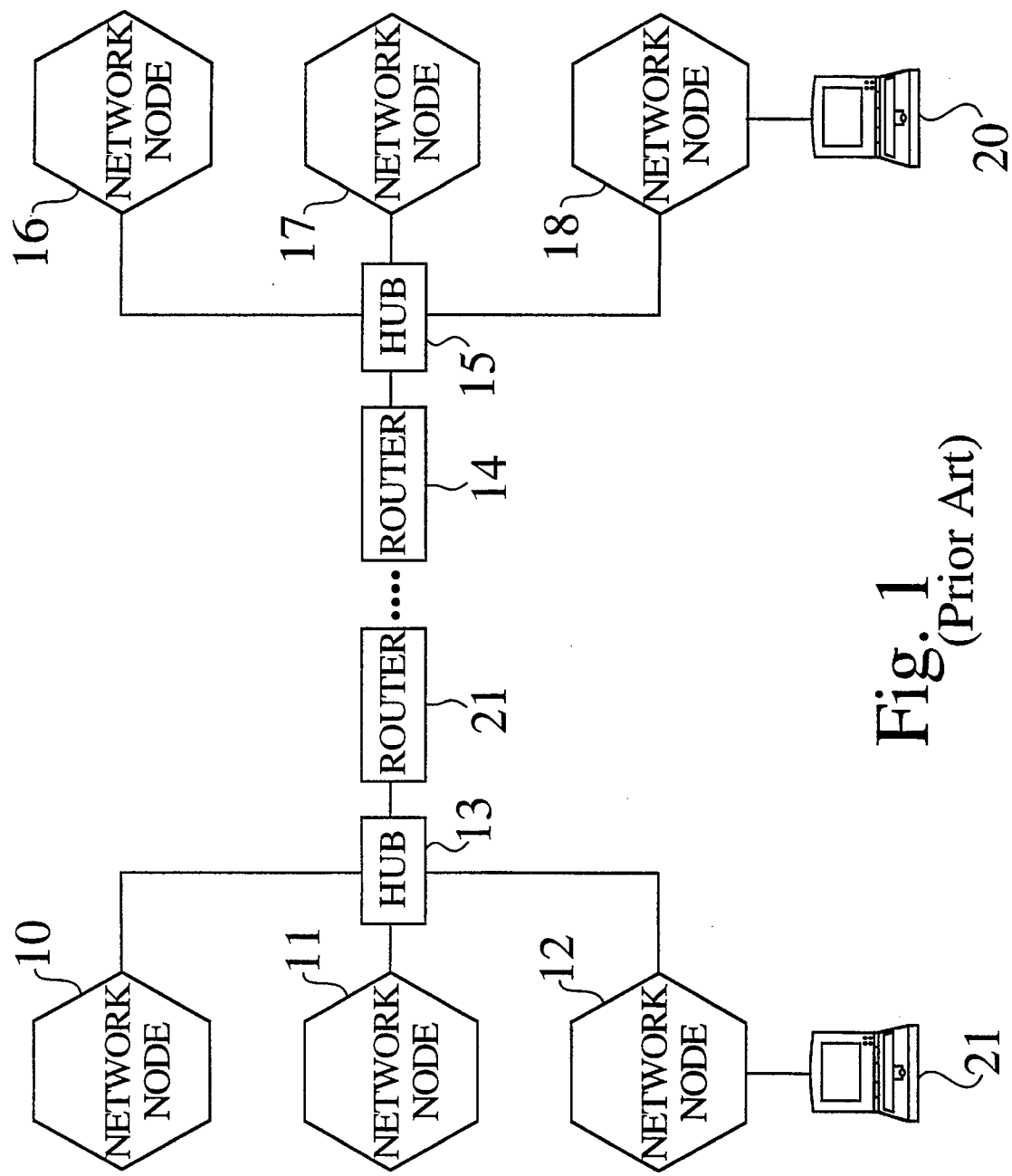
FIG. 1 is a block diagram of a typical computer network.
Figure 2:
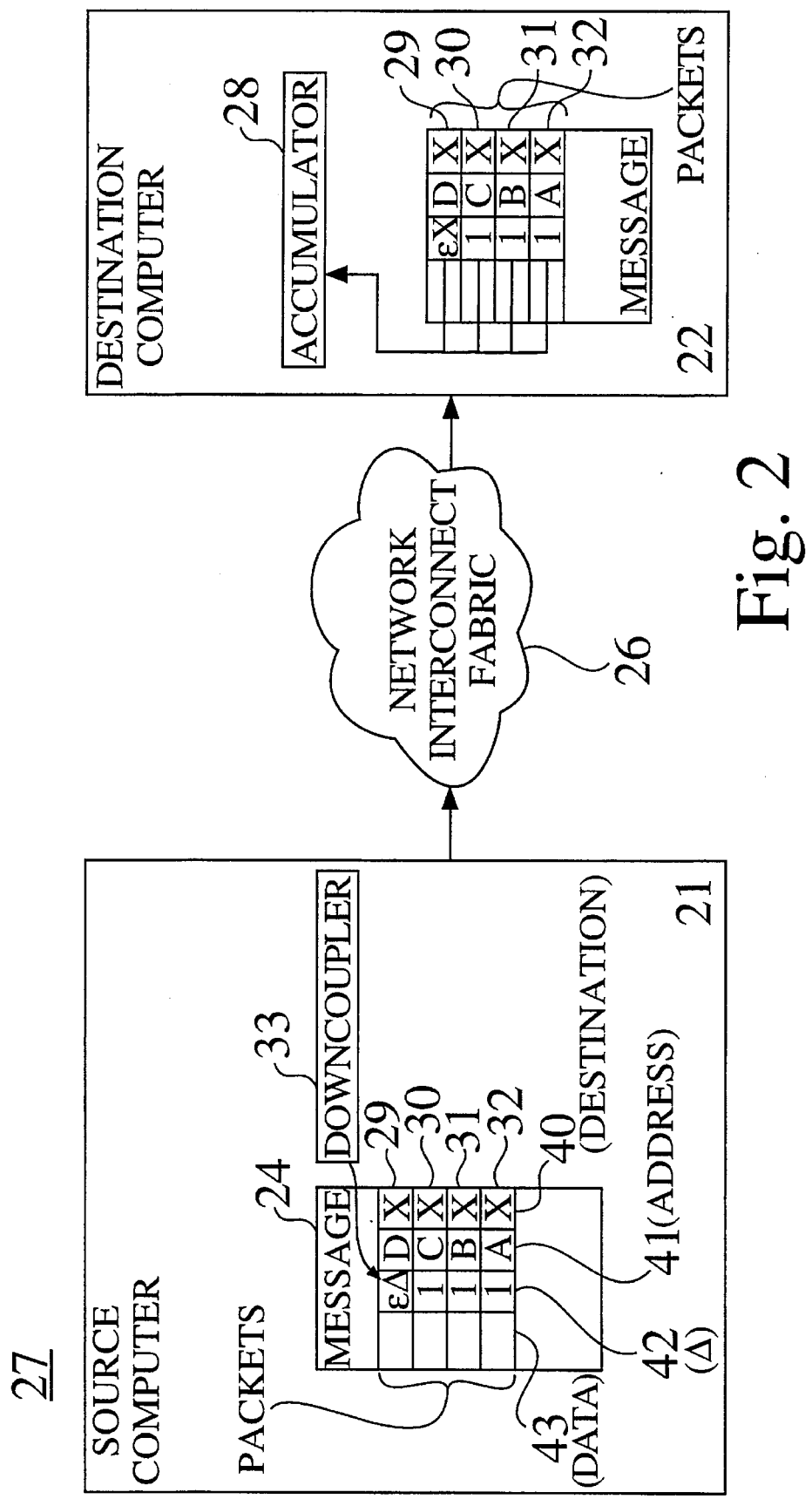
FIG. 2 is a block diagram of a computer network in which the destination computer determines when all of the packets of a message have arrived according to the present invention.

FIG. 2 is a block diagram of a computer network 27 in which the destination computer 22 determines when all of the packets of a message have arrived according to the present invention. A message 24 includes several packets, A (32), B (31), C (30), and D (29) that are sent over a computer network interconnect fabric 26 to a destination computer. Each packet 29–32 of each message has several fields. For example, a generic packet 34 is shown in the figure that includes a destination header 40, an address 41, a "delta" field 42, and a data field 43. (The value of the delta field is in some cases hereinafter referred to by the symbol "$\Delta$".) In the figure, the source computer includes a down counter 33 that counts modulo some predetermined modulus, for example $2^{32}$. Note that an ordinary 32-bit binary counter counts modulo $2^{32}$, because carries/borrows out of the most significant bit are discarded. The counter herein is initialized to an arbitrary value. For all of the packets but the last of a message, the delta field is set to "1" (e.g. in the packets 30, 31, 32) and the counter 33 is decremented by "1" for each such packet. The counter's value is transmitted to the destination computer as the delta field of the last packet 29 of the message.

The destination computer includes an accumulator 28, that accumulates modulo some modulus, for example $2^{32}$. The modulus is hereinafter denoted by the symbol M. (Note that an ordinary 32-bit binary adder and register accumulate modulo $2^{32}$, because carries/borrows out of the most significant bit are discarded.) In the preferred embodiment of the invention, the accumulator is initialized to zero, but any arbitrary value could be used. As each packet arrives at the destination computer, the packet's delta field is added to the accumulator. When the accumulator is brought to zero, indicating that all of the packets have arrived, the destination computer is notified that the message 25 has been received.

In various protocols that may be used in connection with the invention, the sum of the delta fields in the packets is zero or M, both of which are congruent to zero modulo M, causing zero to be in the accumulator after the last message has arrived.

For the single-sender case, the invention includes a protocol in which the software at the source computer initializes the source computer counter to zero, and in which the software at the destination computer initializes the destination computer accumulator to zero. For a message having N packets the sum of the delta fields for all the packets in a message, except the last packet, is equal to the total number of packets minus one, i.e. N−1. The counter is decremented, modulo M, by 1 each time a packet is sent. The initial zero value is congruent to M, and thus the initial zero can be thought of as the modulus. Thus the last packet contains the value M−(N−1). Thus, when all of the delta values for all of the packets are added together, a value of zero is realized. Accordingly, the value of the accumulator at the destination computer returns to zero when all of the packets are received, without regard to the order in which the packets arrive.

If the message consists of just a single packet, the delta value is zero. At the receiving computer this zero is added to the zero that is already there in the accumulator, resulting in a zero value, and the mechanism notifies the receiving computer that all packets have arrived.

In applications that involve multiple senders, the counter of each computer number i is initialized to a value $k_i$, where $k_i$ is a non-zero and positive number greater than or equal to the number of packets that can comprise the message to be sent from computer number i and subject to the condition that the sum over all the senders is equal to the modulus, i.e. $\Sigma k_i = M$.

The restriction on the minimum value of $k_i$ is hardly any restriction at all. In the typical case, the modulus is $2^{32}$, the addressing in the computer at hand inherently limits messages to a maximum size of somewhat less than $2^{32}$ bytes and a typical interconnect accepts packets of about 256 bytes. Thus, most computers could use $k_i = 2^{24}$, and completely disregard the message size constraint, as it would be impossible to violate. This still allows messages from 256 computers to be collected together.

Note that the only real difference between the single-sender case and the multiple sender case is that the single-sender case allows the initial value of the counter to be zero, which may be thought of as the modulus, while this is forbidden in the multiple-sender case.

In the dynamic sender case, computer number i in the initial set of computers known by the receiver is given a quota $k_i$, where $k_i$ is a non-zero and positive number greater than or equal to the number of packets that can comprise all the messages to be sent from computer number i or the from any other computers to which it delegates work, and subject to the condition that the sum over all the senders is equal to the modulus, i.e. $\Sigma k_i = M$. Whenever a computer delegates message sending responsibility to other computers, it must do so in a way such that the sum of the $k_i$ over it and the delegates is the same as the original $k_i$ it received. Prior to sending a message to the receiver each computer sets its counter to its value of $k_i$.

The following rules apply for dynamic sender applications:

1. The quotas delegated by a particular source computer must not exceed the received quota.
2. No source computer can send a message that contains more packets than its quota.
3. If a source computer delegates to other source computers, its own quota is reduced by the amount it delegates to other computers.
4. Each computer must use its quota as the initial value for its counter.

The quota delegation can go to an arbitrary depth, limited only when the quota available to a source computer is smaller that the number of packets that the source computer needs to send.

As an example, let the modulus be $2^{32}$ and let there be four initial senders. Each sender may be given a quota of $2^{30}$. One of those senders may delegate to two other senders, keeping $2^{28}$ for itself, and giving $2^{28}$ to one other and $2^{29}$ to the other. There is no requirement that the numbers be round, only that the sum of the quotas after the delegating process equal the original quote held by the computer doing the delegating.

Other than the delegation of quotas, there is really no difference between the multiple sender case and the dynamic sender case.

Another embodiment of the invention allows the receiving computer to initialize its accumulator to a non-zero value, Z. In this case the initial counter values must satisfy the equation $Z+k_i=M$. In another embodiment of the invention, the delta fields are considered to be signed numbers. The last packet is then considered to have $\Delta=-(N-1)$, where N is the total number of packets comprising messages. In this embodiment the destination computer includes an extra counter, G, that is automatically decremented each time a packet arrives that has a delta value not equal to 1. Such packets are always the last packet of each message transmitted by the source computer. At the beginning of a message, each source computer counter is initialized to zero, the destination computer accumulator is initialized to zero, and the accumulator G is initialized to the number of source computers, e.g. "1" in the case of a single sender. The destination computer is notified when both the destination computer accumulator is zero and the counter G is zero. Note that this embodiment of the invention is not well suited for dynamic sender applications.

Figure 3:
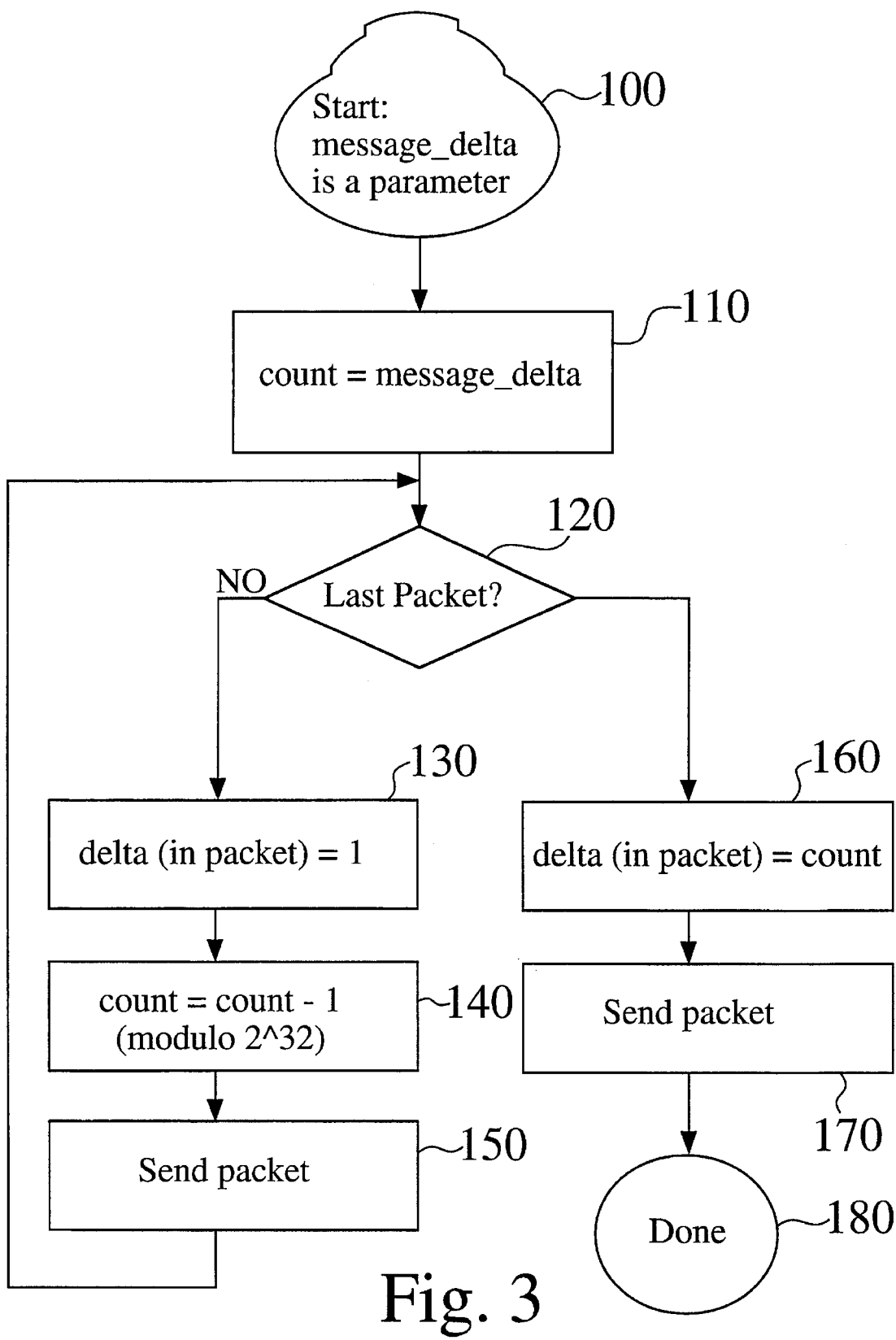
FIG. 3 is a flow diagram of a method for sending a message over a computer network according to the present invention where the destination computer determines when all of the packets of a message have arrived.

FIG. 3 is a flow diagram of a method for sending a message over a computer network according to the present invention where the receiving computer determines when all of the packets of a message have arrived. In the figure, the message__delta value is established (100) at the start of the process. The counter value is set equal to the message__delta value (110) and the source computer checks to determine if the packet about to be transmitted is the last packet of the message (120).

If the current packet is not the last packet of the message, a delta value of "1" is placed in the packet (130) and the counter in the counter is decremented by "1" (140). In the preferred embodiment of the invention, the counter may be a register having a capacity $2^{32}$, Once the delta field is set, the packet is sent (150), and the next packet is examined to determine if it is the last packet of the message (120).

When the last packet of the message is examined, the delta field of the packet is set with the value currently stored in the counter (160) and the packet is then sent (170), at which point the process of sending the message is complete (180).

Figure 4:
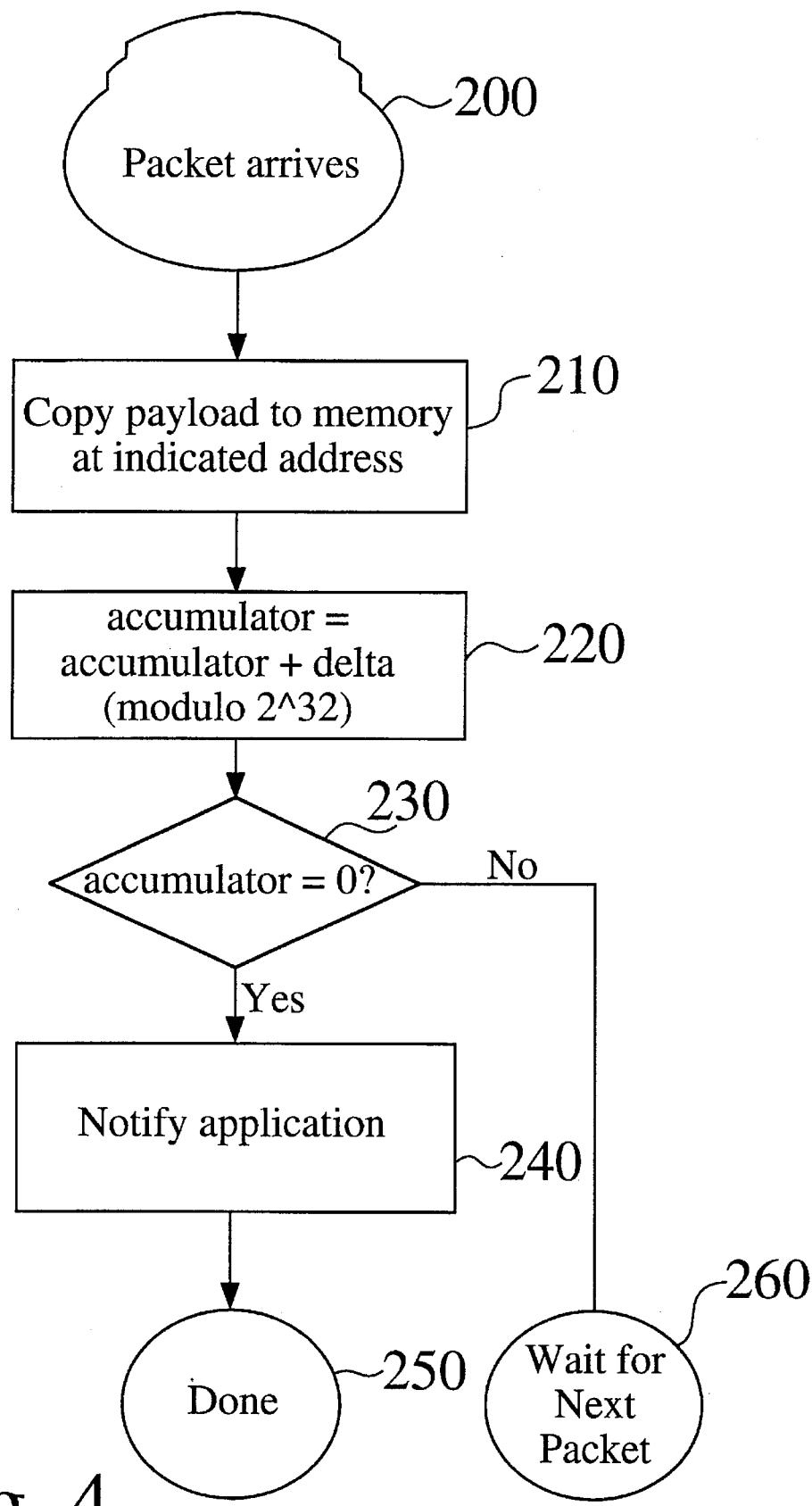
FIG. 4 is a flow diagram of a method for receiving a message over a computer network according to the present invention where the destination computer determines when all of the packets of a message have arrived.

FIG. 4 is a flow diagram of a method for receiving a message over a computer network according to the present invention where the receiving computer determines when all of the packets of a message have arrived. In the figure, a packet arrives at the destination computer (200) and the payload of the packet is copied to the destination computer memory at the address indicated in the packet header (210). The accumulator at the destination computer is initially set to zero. The delta value of the packet is added to the accumulator (220) and the accumulator value is checked to determine if the value is then zero, indicating that all of the packets of the message have arrived (230).

If the accumulator is zero after the designated computations upon arrival of a packet, the application is notified that the message is complete (240) and the process is complete (250). If the accumulator is not zero (230), the destination computer waits for the next packet (260), and the procedure repeats until the last packet is received, as indicated by the accumulator returning to zero.

Proof of Correctness

First, a general observation: The sum of the delta fields in all the packets comprising a message is equal to the initial value of the counter in all cases except for the case of a multiple packet message with the counter initially zero, in which case the sum is equal to the modulus, M.

The proof proceeds in three cases. For the case of a single packet message, delta in the one and only packet is just the value of the counter so $\Sigma\Delta$ equals the initial counter value. For the multiple packet case we proceed to two subcases. For the case where the counter is initially non-zero, every time a "1" is sent in the delta field, the counter is decreased by one, maintaining the invariant that the sum of current counter value and the delta fields of all preceding packets constant. The delta field in the last packet is the value of the counter at that stage. So the sum of the delta value of the last packet and all the preceding packets is equal to the initial value of the counter. The case when the counter is initially zero proceeds by noting that after the first packet has been sent, the counter contains M−1. By the argument of the previous case, the sum of the delta values of all the remaining packets must be M−1, and delta was 1 in the first packet, so the complete sum of the delta values in all the packets must be M.

The single-sender Case

By the general observation above, and the precondition that the accumulator is initially zero, the accumulator returns to zero when all the packets comprising the message have arrived. The proof that zero is obtained only when all the packets have arrived proceeds in two cases, this first is the case of just one packet, and the second is the case when the number of packets is two or larger. In the first, case, the delta value is zero as is the initial value of the accumulator, so a zero value is obtained on the first packet, which is correct. In the second case, all the delta values are non-zero and positive. If at least one packet has arrived the sum must be non-zero. If any packets are missing, the sum is less than the modulus and thus insufficiently large to make the counter wrap around to zero, so the counter must be non-zero.

The Multisender Case

By the protocol, each computer's counter is initialized to some value $k_i$. By the general observation, when all the packets from computer number i have arrived, the contribution of the delta fields from those packets to the value in the accumulator is $k_i$.

Thus when all the packets have arrived the accumulator has accumulator a total of $\Sigma k_i=M$, and has just rolled over to zero. All the packets have $\Delta>0$, so if any are missing but at least one has arrived, the sum of the delta values received must be less than the modulus, but non-zero, and thus the counter must be non-zero.

The Dynamic Sender Case

Each source computer has a quota that it divides between itself and other source computers to which it delegates sending. By the protocol the sum of the initial quotas equals the modulus, and the delegation process preserves this invariant. The remainder of the proof is identical to the multi-sender case.

The Variant With A Separate G Counter

G is zero if and only of all the final packets have arrived. Thus, each of these packets have made their contribution to the destination computer accumulator, and its value is then just the negative of the number of outstanding packets, and is zero if and only of all the packets have arrived. There are a number of possible variant protocols in which the counter at the receiving computer is initialized to a non-zero value. The most obvious is where the each computer is given some quota $k_i$, as in the multiple sender case or the dynamic sender case, but without the restriction that $\Sigma k_i$=modulus. The receiving computer sets the initial value of its accumulator to $M=\Sigma k_i$. By the general observation the arrival of all the messages increases the accumulator by $K_i$, making it just reach the modulus and thus roll over to zero. The remainder of the proof is as in the multiple sender case.

Although the invention is described herein with reference to the preferred embodiment, one skilled in the art will readily appreciate that other applications may be substituted for those set forth herein without departing from the spirit and scope of the present invention. For example, an important aspect of the invention is that the packets have values that sum to a value that can be known by the destination computer. The preferred embodiment of the invention puts a "1" in the delta fields of all packets but the last packet of a message and a special value in the delta field of the last packet of the message. However, the invention equally applies to any scheme that puts these values or any representation thereof in the packets, regardless of order. The invention also applies to any scheme that reverses the signs of the values or multiplies them by a constant. Additionally, the values accumulated may be in any desired units, such as bytes or words. Accordingly, the invention should only be limited by the Claims included below.

I claim:

1. An apparatus for determining when all packets of a message sent across a computer network have arrived at their destination, comprising:

a counter located at at least one source computer, said counter storing an initial value therein and being adapted to assign a delta value to each packet in a message, wherein a first delta value is assigned to each packet in a message but the last packet;

means for decrementing said counter for each packet sent, wherein said counter stores a second delta value that is to the initial value store in the counter decreased by the number of packets previously sent, and wherein said second delta value is assigned to said last packet; and an accumulater located at a destination computer, said accumulater being adapted to extract said delta value from each packet of said message;

wherein said destination computer is notified that all packets in said message have arrived only when the sum of said extracted delta values stored in said accumulator is equal to the initial value stored in aid accumulator.

2. The apparatus of claim 1, wherein each packet in said message has a delta field.

3. The apparatus of claim 1, wherein the modulus of said counter is equal to the modules of said accumulator.

4. The apparatus of claim 1, wherein said message is distributed such that it is sent by at least two source computers.

5. The apparatus of claim 4, wherein at least one of said at least two source computers delegates sending a portion of said message to at least one additional source computer.

6. The apparatus of claim 1, further comprising:

a protocol for initializing at least one of said counter and said accumulator to zero.

7. The apparatus of claim 6, wherein the sum of the delta values for all the packets in a message is congruent to zero modulo the modulus of the accumulator, such that the value of the accumulator returns to zero when all of the packets are received, without regard to the order in which the packets arrive.

8. The apparatus of claim 1, further comprising:

at least two source computers, wherein the counter of each source computer is initialized to a value $k_i$, i specific to each computer, where $k_i$ is a positive number greater than or equal to the number of packets that can comprise the message to be sent by that computer; and wherein the sum of the counter values is the modulus of the accumulator.

9. The apparatus of claim 1, further comprising:

at least two source computers, wherein the counter of each source computer is initialized to a value $k_i$, i specific to each computer, where $k_i$ is a positive number greater than or equal to the number of packets that comprise the message to be sent by that computer; and wherein the accumulator of the receiving computer is initialized to a number given by the modulus of the accumulator diminished by the sum of the $k_i$.

10. The apparatus of claim 1, further comprising:

at least one source computer known directly by said destination computer, wherein at least one of said source computers may delegate message transmission to one or more delegate source computers, and wherein said source computer receives a quota, and the counter in said source computer is initialized to the quota it received minus the sum of quotas passed to said one or more delegate source computers.

11. The apparatus of claim 10, wherein the quotas delegated by a particular source computer must not exceed a received quota.

12. The apparatus of claim 10, wherein no source computer can send a message that contains more packets than its quota.

13. The apparatus of claim 10, wherein a source computer that delegates to other source computers cannot delegate more than the quota it received minus quota it retains for itself.

14. A method for determining when all packets of a message sent across a computer network have arrived at their destination, comprising the steps of:

storing an initial value in a counter located at at least one source computer;

decrementing said counter for each packet sent;

assigning a first delta value to each packet in a message except a last packet;

storing a second delta value that is equal to the initial counter value minus the number of packets previously sent;

assigning a second delta value to said last packet;

sending each packet from said source computer to a destination computer over said computer network, wherein said each packet includes said delta value assigned to said packet;

extracting said delta value from each packet of said message at said destination computer;

summing said extracted delta values into an accumulator located at said destination computer; and notifying said destination computer that all packets in said message have arrived only when the sum of said extracted delta values stored in said accumulator is equal to the initial value stored in said accumulator.

15. The method of claim 14, wherein each packet in said message has a delta field.

16. The method of claim 14, wherein the modulus of said counter is equal to the modulus of said accumulater.

17. The method of claim 14, wherein said message is distributed such that it is sent by at least two source computers.

18. The method of claim 17, wherein at least one of said at least two source computers delegates sending a portion of said message to at lest one additional source computer.

19. The method of claim 14, further comprising the step of:

initializing at least one of said counter and said accumulator to zero.

20. The method of claim 19, wherein the sum of the delta values for all the packets in a message is congruent to zero modulo the modulus of the accumulator, such that the value of the accumulator returns to zero when all of the packets are received, without regard to the order in which the packets arrive.

21. The method of claim 14, further comprising the step of:

initializing the counters of each at least two source computers to a value $k_i$ specific to each computer, where $k_i$ is a positive number greater than or equal to the number of packets that can comprise the message to be sent by that computer; and where the sum of the counter values is the modulus of the accumulator.

22. The method of claim 14, further comprising the step of:

initializing the counters of each of at least two source computers to a value $k_i$, i specific to each computer, where $k_i$ is a positive number greater than or equal to the number of packets that the message to be sent by that computer; and where the accumulator of the receiving computer is initialized to a giving by the modulus of the accumulator diminished by the sum of the $k_i$.

23. The method of claim 14, further comprising the steps of:

delegating message transmission from at least one of two source computers to at least one additional source computer;

giving each source computer a quota; and setting the counter in said source computer to the original quota minus the sum of the quotas delegated to each additional computer.

24. The method of claim 23, wherein the quotas delegated by a particular source computer must not exceed a received quota.

25. The method of claim 23, wherein no source computer can send a message that contains more packets than its quota.

26. The method of claim 23, wherein a source computer that delegates to other source computers cannot delegate more than the quota it received minus the quota it retains for itself.

* * * * *